Dec. 16, 1969

3,484,614

POSITION CONTROL METHOD AND APPARATUS

Filed Oct. 14, 1965

Dec. 16, 1969  F. S. TOBEY ET AL  3,484,614
POSITION CONTROL METHOD AND APPARATUS
Filed Oct. 14, 1965  2 Sheets-Sheet 2

3,484,614
**POSITION CONTROL METHOD
AND APPARATUS**
Frederic Samuel Tobey, Walpole, Mass., and Roby Byron
 White, Cumberland, R.I., assignors to W. H. Brady
 Co., Milwaukee, Wis., a corporation of Wisconsin
Filed Oct. 14, 1965, Ser. No. 495,849
Int. Cl. G01j 1/36
U.S. Cl. 250—204                                     5 Claims

ABSTRACT OF THE DISCLOSURE

Apparatus is provided for sensing a mark having a reflectivity different from its background by means of a fiber optics probe having at least two separated groups of fibers, along which light is reflected toward a pair of light sensors, the two groups lying at the probe tip, relative to each other, along the direction of relative position they are to control, and means for causing relative movement of probe and eyemark along said direction until each of the pair of light sensors senses the same amount of light.

---

This invention relates to controlling the relative position of two objects by controlling the relative position of an eyemark and a fiber optics probe.

It is the primary object of the invention to make possible such control with ease, simplicity, and great accuracy. A further object is to do so with small eyemarks (minimizing in some applications possible waste of material) and small probes (to which are accessible more potential eyemark locations).

In general, the invention features sensing a mark having a reflectivity different from its background by means of a fiber optics probe having at least two separated groups of fibers, along which light is reflected toward a pair of light sensors, the two groups lying at the probe tip, relative to each other, along the direction of relative position they are to control, and causing relative movement of probe and eyemark along said direction until each of the pair of light sensors senses the same amount of light. In a preferred embodiment, the position of metal label portions successively appearing on a metal web relative to a cutting die for cutting out the labels is controlled by an eyemark of diamond shape near each label portion and a probe with five groups of fibers; at the tip of the probe the light-introducing group is circular and at the center of the probe, while four light-sensing groups are symmetrically grouped therearound in annular quadrants, to cooperate with two pairs of light sensors, each pair with its related position control circuitry and mechanism, to produce relative motion in two directions until light received in opposed sensors of each pair is equal. The invention also features the novel probe.

Other objects, features, and advantages will appear from the following description of a preferred embodiment of the invention, taken together with the attached drawings thereof, in which.

Figure 1:
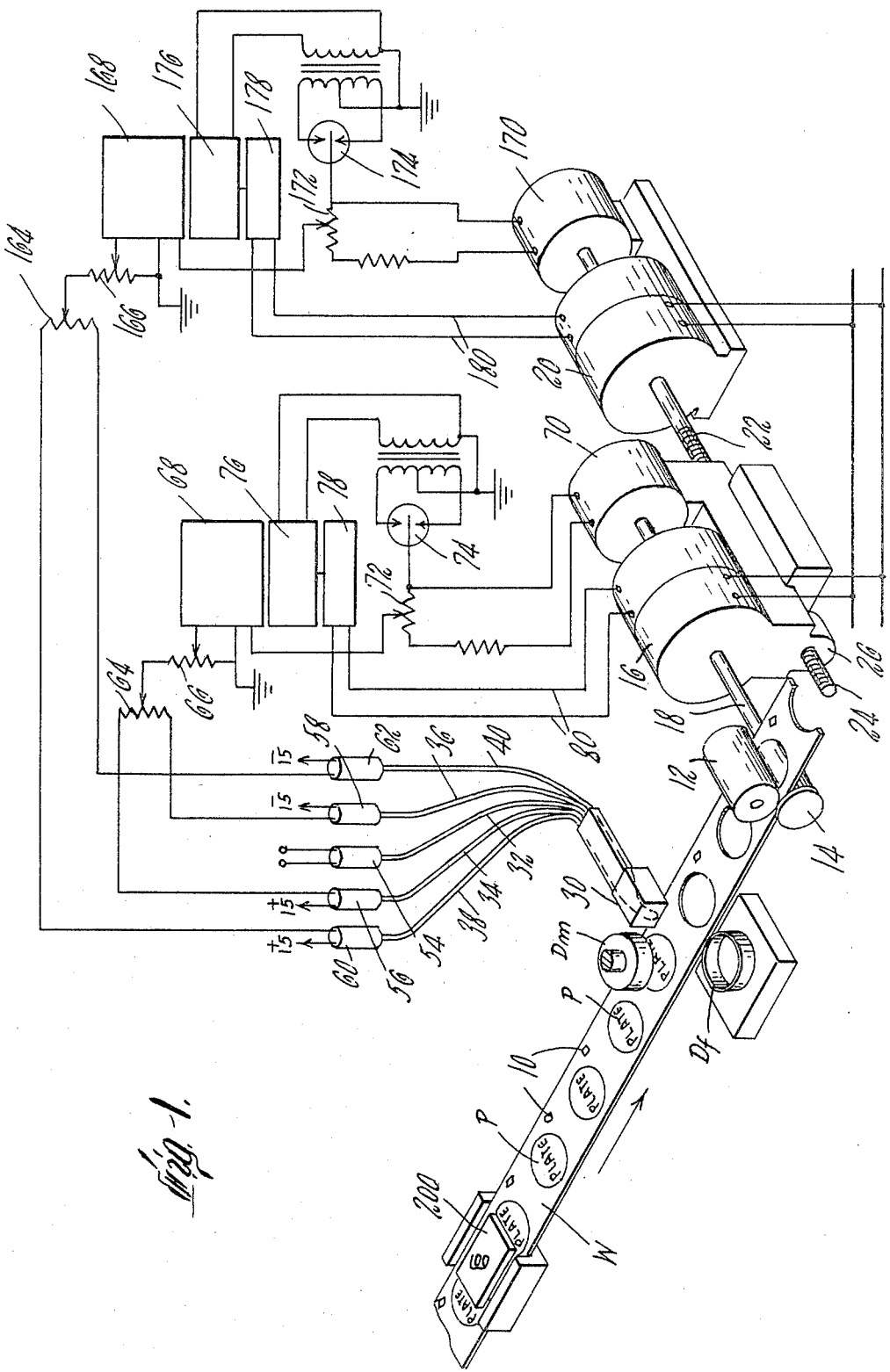
FIG. 1 is a combined partially diagrammatic perspective view of mechanical portions of a preferred embodiment and a circuit diagram of electrical portions thereof.
Figure 6:
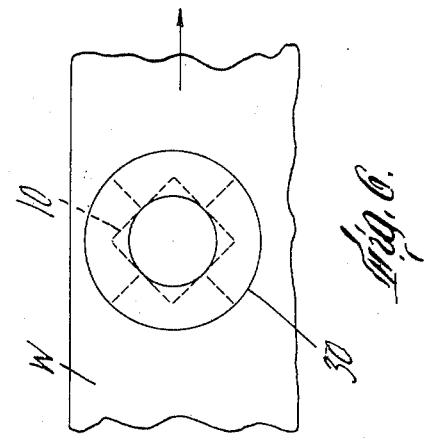
FIG. 6 is a diagrammatic plan view of said probe overlying a preferred eyemark.
Figure 2:
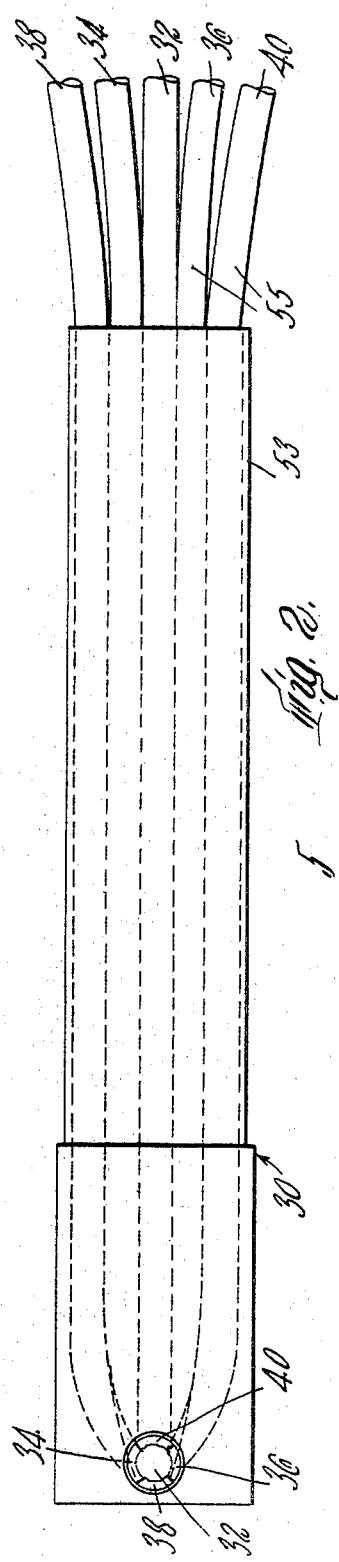
FIG. 2 is a bottom plan view of a preferred probe of the invention.
Figure 3:
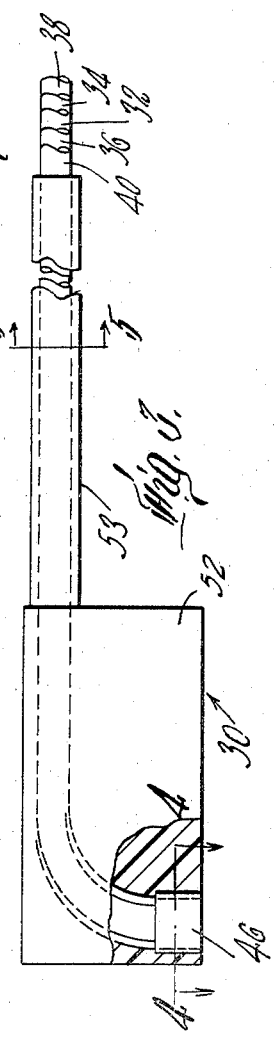
FIG. 3 is a side elevation view of said probe, partially in section and partially broken away.
Figure 5:
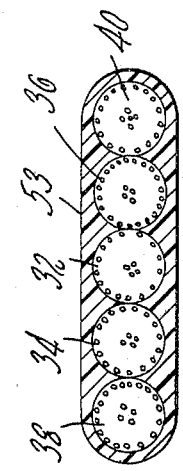
FIG. 5 is a sectional view taken at 5—5 of FIG. 3.
Figure 4:
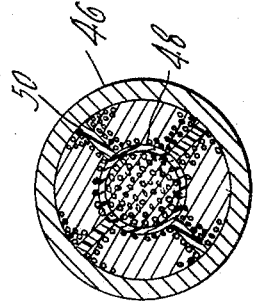
FIG. 4 is a sectional view taken at 4—4 of FIG. 3.

There is shown in FIG. 1 a web (or workpiece) of shiny aluminum W on which is imprinted at spaced intervals in black ink a multiplicity of plates or labels P. Imprinted in black ink at the same time as each label, always in the same relation to but just outside it near an edge of the web, is an eyemark (or indicium) 10, which is of square diamond shape in each direction of web W is feed.

The web W is driven in a longitudinal direction by rubber-covered feed rollers 12 and 14, the latter of which is rotated by 2-phase 2-pole 20 lb. watt A.C. servo motor (or transducer) 16 (manufactured, e.g., by the Diehl Division of Singer Company, Somerville, N.J.) through shaft 18. The web is driven in a sidewise or transverse direction by motor (or transducer) 20 acting through shaft 22, the threaded end 24 of which engages mating threads in the base 26 of the longitudinal drive motor 16.

Extending over the edge of web W is probe 30, shown in more detail in FIGS. 2 through 6. Fiber optic probe 30 carries five bundles (or groups) of fibers: a light-introducing bundle (or group) 32 $\frac{1}{16}$ in diameter, with its probing face at the center of the probe tip and circular in shape there; two light-withdrawing (following reflection beneath the probe tip) bundles (or groups) 34 and 36, with their probing faces annular quadrants on opposite sides of the bundle (or group) 32 probing face, for longitudinal web movement control; and two light-withdrawing bundles (or groups) 38 and 40, with their probing faces annular quadrants (overall outside diameter of $\frac{1}{8}$ inch) on opposite sides of the bundle (or group) 32 probing face circumferentially between the bundles 34 and 36 at the probe tip, for transverse web movement control. It has been found that results are best if each side of diamond eyemark 10 is of length equal to the diameter of light-introducing bundle (or group) 32. The fiber bundles are encased at the probe tip in stainless steel ferrule 46, and separated from one another by epoxy dividers 48 and 50. The entire tip is encapsulated in epoxy block 52. The probe includes rigid portion 53 and flexible bundle sheaths 55.

Fiber bundle 32 is illuminated by a three-volt lamp 54 (e.g., that sold by the General Electric Company as No. 222). Light reflected from the web W (either from an eyemark 10 or the background) is withdrawn through fiber bundles 34, 36, 38, and 40, in each instance to a separate photo-resistive photocell 56, 58, 60, or 62 (each suitably the Clairex No. CL905HLL). Photocells 56 and 58, sensing respectively light reflected through fiber optics bundles 34 and 36, are connected in series with a first battery providing a negative 15 volts and a second battery providing a positive 15 volts, respectively. Photocells 60 and 62, sensing respectively light reflected through fiber optics bundles 38 and 40, are connected in series also with said first and second batteries, respectively.

Thus, as will be plain, the bundle or group 34 is a first group of fibers, with first ends of the fibers therein in a first zone (as shown, planar, FIGS. 3 and 4) and second ends of the fibers therein in a second zone adjacent the first photocell 56; and the bundle or group 36 is a second group of fibers with first ends of the fibers therein in a third zone (as shown, FIGS. 3 and 4, planar) and second ends of the fibers therein in a fourth zone adjacent photocell 58. The bundle 32 is a third group of fibers with first ends of the fibers planar in a fifth zone adjacent to the first and third zones, and with second ends of the fibers in a sixth zone adjacent to lamp 54. The bundle 38 is a fourth group of optic fibers with first ends of the fibers therein planar in a seventh zone and second ends thereof in an eighth zone adjacent photocell 60. The bundle 40 is a fifth group of optic fibers with first ends of the fibers thereof planar in a ninth zone and second ends thereof in a tenth zone adjacent photocell 62.

Any difference in light energy received between photocell 56 and photocell 58 is sensed as a net voltage (or error signal) at balance potentiometer (or comparator) 64, where the net may be positive or negative.

The net voltage in potentiometer 64 is introduced through variable gain (so that variations in contrast between eyemark 10 and its background in web W can be made to give a constant rate of change in volts per inch of displacement of the eyemark relative to the probe) potentiometer 66 into output limited operational amplifier 68 (e.g., such as is sold by Philbrick Researches, Inc., Boston, Mass.), which protects the other amplifiers against oversaturation and improves feedback control.

Generator 70 is rotated by motor or transducer 16 to generate a voltage proportional to motor speed, and of polarity depending on motor direction of rotation. A portion of this voltage is picked off by stability potentiometer 72 and subtracted from the output of output limited operational amplifier 68, as a feedback to discourage oscillation. The remainder of said output is introduced into chopper 74, which converts it into a 60-cycle A.C. signal (of phase shifted 180° with each shift in polarity of the signal from amplifier 68). Intermediate and power amplifiers 76 and 78 amplify this signal to drive servo motor 16 in whichever direction (phase shift controls motor field through lines 80) tends to eliminate any voltage imbalance at balance control potentiometer 64.

Any difference in light energy received between photocell 60 and photocell 62 functions through identical circuitry and mechanisms to produce transverse web movement through motor 20. The elements numbered 164, 166, 168, 170, 172, 174, 176, 178, and 180 correspond individually, functionally, and in their relationship to one another respectively to the elements numbered 100 less in the longitudinal position control portion of the embodiment disclosed.

When any portion of the eyemark is reflecting to at least a part of at least one bundle of each pair (longitudinal and transverse control) of fiber bundles, there is a light energy reflection imbalance between the corresponding photocells of each pair until the eyemark is brought very precisely beneath the center of the probe tip, and this the embodiment described accordingly quickly accomplishes. Each eyemark 10 is so related to its adjacent plate P that the latter may then be cut by dies $D_m$ and $D_f$. (After each cut, motor 16 is switched to control by a counter, in a manner well understood in the art, which causes gross movement longitudinally of web W in an amount sufficient to bring the next eyemark under at least a portion of at least one of each pair of fiber bundles; after the count the motor 16 is switched back to control by the circuitry above described for a repeated centering operation. The web W is held taut during feeding by inwardly felt-surfaced spring-loaded pressure pad 200.)

Other embodiments within the following claims will occur to those skilled in the art. Thus, the eyemark and its background may be different reflectivity in various ways; or the eyemark may be round, or triangular, or linear (if, say, only transverse positioning is desired), or of other shape; or only a pair of light-withdrawing bundles may be used for control along a single direction (as transverse positioning control in a continuously moving web); or light-introducing fibers may be mingled evenly with light-withdrawing fibers in each of say two or four bundles divided into quarters or semicircles at the common end (whereupon positioning will take place to center the intersections respectively of the quarters and semicircles under the tip).

What is claimed is:

1. A position control device responsive to light energy falling on a workpiece bearing an indicium of reflectivity different from the reflectivity of the workpiece surface thereabout comprising:
   a first group of optic fibers,
      individual fibers in said first group having a first end and a second end,
      the first ends of said fibers being positioned in a first zone and the second ends of said fibers being positioned in a second zone,
   a second group of optic fibers,
      individual fibers in said second group having a first end and a second end,
      the first end of fibers in said second group being in a third zone and the second end of fibers in said second group being in a fourth zone,
      said first zone being spaced from and adjacent to said third zone, light energy falling on a workpiece bearing an indicium of reflectivity different from the reflectivity of the workpiece surface thereabout,
   a first photocell mounted adjacent said second zone to accept light energy transmitted by reflection from said workpiece through said first group of optic fibers,
   a second photocell mounted adjacent said fourth zone to accept light energy transmitted by reflection from said workpiece through said second group of optic fibers,
   a comparator electrically connected with said first photocell and said second photocell to compare the signal outputs of said photocells to produce an error signal if said first and third zones do not equally overlie said indicium, and
   a transducer, said transducer being electrically connected with said comparator to receive said error signal, and being mechanically connected to jointly drive said first and third zones, and said workpiece surface, relative to each other, to reduce said error signal,
   whereby said first and third zones are centered over said indicium.

2. The position control device of claim 1 which includes:
   a third group of optic fibers,
      individual fibers in said third group having a first end and a second end,
      the first ends of the third group fibers being positioned in a fifth zone and the second ends thereof being positioned in a sixth zone, and
   a source of light energy positioned adjacent said sixth zone,
   said fifth zone being equidistantly spaced from, and adjacent to, said first and third zones,
   whereby light emerging onto said workpiece through said fifth zone is reflected from said workpiece through said first and third zones.

3. The position control device of claim 2 which includes:
   a fourth group of optic fibers,
      individual fibers in said fourth group having a first end and a second end,
      the first ends of the fourth group fibers being positioned in a seventh zone and the second ends thereof being positioned in an eighth zone,
   a fifth group of optic fibers,
      individual fibers in said fifth group having a first end and a second end,
      the first ends of the fifth group fibers being positioned in a ninth zone and the second ends thereof being positioned in a tenth zone,
      said seventh and ninth zones being equidistantly spaced from, and adjacent to, said fifth zone,
   a third photocell mounted adjacent said eighth zone to accept light energy transmitted by reflection from said workpiece through said fourth group of optic fibers,
   a fourth photocell mounted adjacent said tenth zone to accept light energy transmitted by reflection from said workpiece through said fifth group of optic fibers,
   a second comparator electrically connected with said third photocell and said fourth photocell to compare the signal outputs of said photocells to produce a second error signal if said seventh and ninth zones do not equally overlie said indicium, and a second transducer, said second transducer being electrically connected with said second comparator to receive said second error signal, and being mechanically connected to jointly drive said seventh and ninth zones, and said workpiece surface, relative to each other, to reduce said error signal, said transducer producing relative movement of said workpiece surface and of said first, third, seventh, and ninth zones along two paths, a first path governed by one of said error signals, and a second path at right angles to said first path and governed by the other of said error signals, whereby said seventh and ninth zones as well as said first and third zones are positioned correspondingly over said indicium.

4. The device of claim 3 having in combination therewith said workpiece, said indicium having the shape of a diamond, each diagonal of said diamond corresponding generally in direction with a said path.

5. The device of claim 4 in which said first, third, fifth, seventh, and ninth zones are coplanar, said fifth zone being defined by a circle and said first, third, seventh and ninth zones being annular quadrants therearound, the circle defining the outer boundary of said quadrants being of diameter greater enough so that when positioned over said diamond each side thereof at least in part does not extend therebeyond.

References Cited
UNITED STATES PATENTS

| | | | |
|---|---|---|---|
| 2,792,504 | 5/1957 | Slamar et al. | 250—219 |
| 3,182,291 | 5/1965 | Nassimbene | 250—227 X |
| 3,235,672 | 2/1966 | Beguin | 250—227 X |
| 3,260,849 | 7/1966 | Polye | 250—227 X |
| 3,327,584 | 6/1967 | Kissinger | 250—227 X |
| 3,322,952 | 5/1967 | Jewell | 250—202 |

JAMES W. LAWRENCE, Primary Examiner

V. LAFRANCHI, Assistant Examiner

U.S. Cl. X.R.

250—219, 224, 227, 234; 350—96